United States Patent [19]

Kuretake et al.

[11] Patent Number: 5,427,405
[45] Date of Patent: Jun. 27, 1995

[54] RETAINER USED FOR AN AIR BAG DEVICE

[75] Inventors: Masato Kuretake; Kazuhiko Yamakawa; Motonobu Kitagawa; Sawayo Uda; Yoshimi Yoshida; Takayasu Zushi, all of Shiga, Japan

[73] Assignee: Takata Corporation, Tokyo, Japan

[21] Appl. No.: 93,698

[22] Filed: Jul. 20, 1993

[30] Foreign Application Priority Data

Aug. 31, 1992 [JP] Japan ................... 4-231797

[51] Int. Cl.6 .............................. B60R 21/16
[52] U.S. Cl. ..................... 280/728.2; 280/731
[58] Field of Search ............. 280/728 A, 728 B, 731, 280/732, 730 R, 728 R

[56] References Cited

U.S. PATENT DOCUMENTS

| 4,836,576 | 6/1989 | Werner et al. ............ 280/728 B |
| 5,056,814 | 10/1991 | Shiraki et al. ............ 280/728 B |
| 5,118,132 | 6/1992 | Nakajima ................ 280/728 B |
| 5,118,133 | 6/1992 | Zushi et al. ............. 280/728 A |
| 5,125,683 | 6/1992 | Nakajima ................ 280/728 B |
| 5,183,289 | 2/1993 | Zeller et al. ............. 280/731 |

FOREIGN PATENT DOCUMENTS

| 4328056 | 11/1992 | Japan ................ 280/728 B |
| 2237247 | 5/1991 | United Kingdom . |

Primary Examiner—Margaret A. Focarino
Assistant Examiner—Peter C. English
Attorney, Agent, or Firm—Kanesaka & Takeuchi

[57] ABSTRACT

A retainer used for an air bag device for use in a driver's side of a vehicle includes a main plate portion having an opening for mounting an inflator and mounting members depending from the sides of the main plate portion, wherein the retainer is made of a synthetic resin.

2 Claims, 3 Drawing Sheets

RETAINER USED FOR AN AIR BAG DEVICE

FIELD OF THE INVENTION

The present invention concerns a retainer used for an air bag device for use in a driver's side of a vehicle and, more in particular, it relates to a retainer made of a synthetic resin intended for reduced weight and increased strength.

DESCRIPTION OF THE RELATED ART

An air bag device for use in a driver's side of a vehicle has such a constitution that an air bag and an inflator (gas generator) for extending the air bag are mounted to a mounting bed referred to as a retainer, and the air bag is covered with a module cover. A usual module cover has a box-shaped configuration opened at the bottom and is secured at lower edges thereof to the retainer.

When the inflator is actuated to generate a gas, by which the air bag is extended, an extremely large stress is applied to the retainer. In order to withstand the large stress, the retainer has been made of metal such as iron.

Since the retainer made of iron has a large weight, the weight of the conventional air bag device is increased by so much. Since the air bag device for use in the driver's side of a vehicle is usually attached to steering means, there has been a problem that it requires a great force for rotating the steering means if the weight of the air bag device is large. In addition, an anti-rusting treatment is required for the retainer made of iron, which increases the manufacturing cost.

OBJECT AND SUMMARY OF THE INVENTION

A retainer used for an air bag device in a first aspect according to the present invention comprises a main plate portion having an opening for mounting an inflator and mounting members depending from the sides of the main plate portion, wherein the retainer is made of a synthetic resin.

A retainer used for an air bag device in a second aspect is defined as in the first aspect wherein a reinforcing material comprising at least one of long fibers, mesh and metal plate with holes is buried in the synthetic resin.

A retainer used for an air bag device in a third aspect is defined as in the first aspect, wherein the mounting members are provided with mounting holes for mounting the retainer to steering means, and first long fibers extending around the periphery of the opening in the main plate portion and second long fibers extending from the main plate portion, passing through the portion on the side opposite to the opening and then returning again to the main plate portion are buried as a reinforcing member.

In the present invention, the synthetic resin may be either a thermoplastic synthetic resin or a thermosetting synthetic resin.

Since the retainer is made of the synthetic resin, the weight of the retainer can be reduced. If the synthetic resin is FRP (Fiber Reinforcing Synthetic Resin), or long fibers, mesh or metal plate with holes is buried in the synthetic resin as required, the strength can be increased sufficiently. Further, by arranging the long fibers, the strength for attaching the retainer to the steering means can be increased.

Preferred Embodiments

Figure 1:
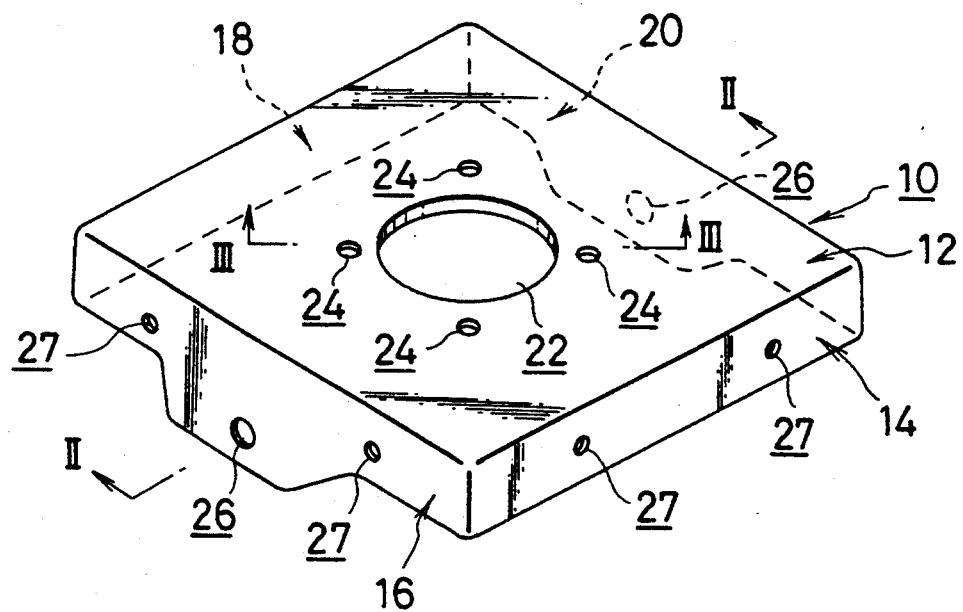
FIG. 1 is a perspective view of a retainer 10 according to a preferred embodiment.

Descriptions will now be made by way of preferred embodiments with reference to the drawings. FIG. 1 is a perspective view illustrating a retainer used for an air bag device according to a preferred embodiment of the present invention, FIG. 2 is a cross sectional view taken along a line II—II in FIG. 1 and FIG. 3 is a cross sectional view taken along a line III—III in FIG. 1.

A retainer 10 of an air bag device comprises a main plate portion 12 in a square plate shape, and mounting members 14, 16, 18 and 20 depending from the sides of the main plate portion 12. An opening 22 is formed at the center of the main plate portion 12 for inserting an inflator therethrough. Further, bolt passing holes 24 are perforated at the periphery of the opening 22 for mounting the inflator or mounting the air bag. Mounting holes (bolt passing holes) 26 are disposed in the mounting members 16, 20 for mounting the air bag device to the steering means of an automobile. Reference numeral 27 denotes a rivet hole for mounting the module cover to the retainer 10.

Figure 2:
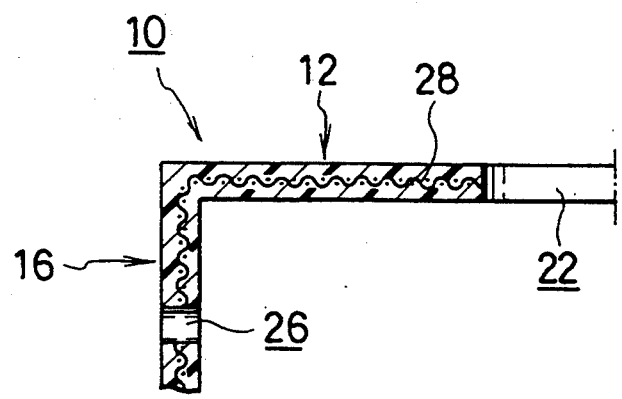
FIG. 2 is a cross sectional view taken along a line II—II in FIG. 1.
Figure 3:
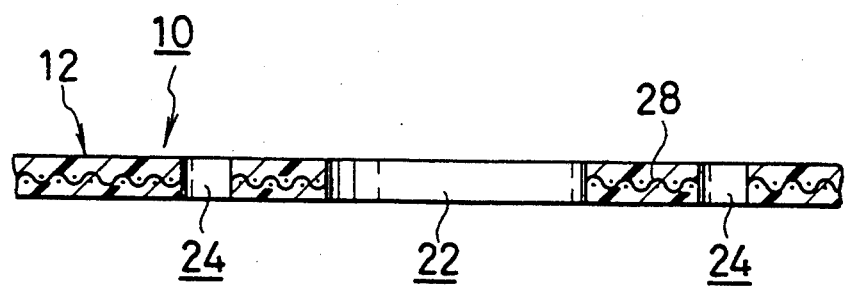
FIG. 3 is a cross sectional view taken along a line III—III in FIG. 1.

The retainer 10 used for the air bag is made of a glass fiber-reinforced synthetic resin (synthetic resin containing chopped strands) and, as shown in FIGS. 2 and 3, a reinforcing metal mesh 28 is buried in the main plate portion 12 and the mounting members 14, 16, 18 and 20 respectively.

The thus constituted retainer 10 is made of the synthetic resin and has a reduced weight as compared with a conventional metal retainer. In addition, since it is reinforced with the mesh 28, the strength is also sufficiently high.

Figure 4:
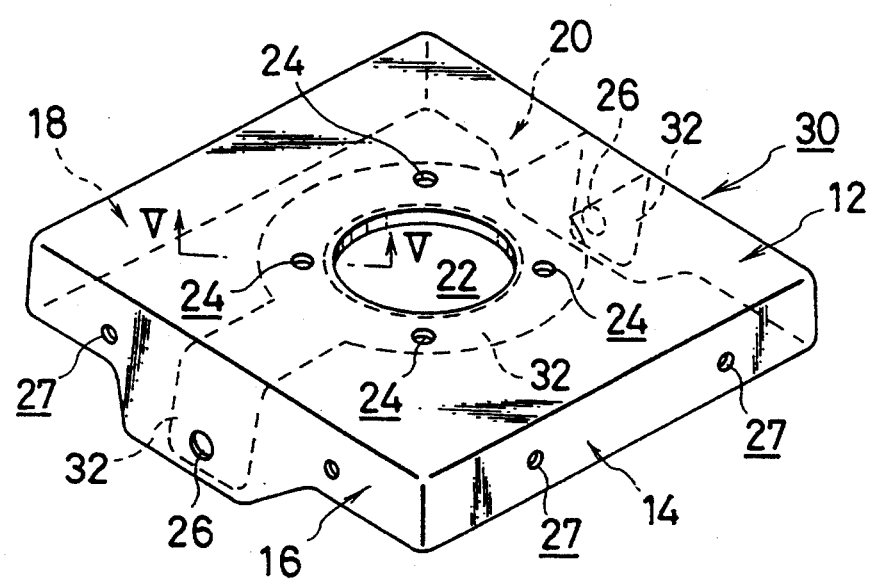
FIG. 4 is a perspective view of a retainer 80 according to a preferred embodiment.
Figure 5:
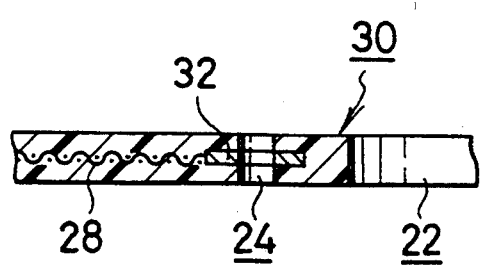
FIG. 5 is a cross sectional view taken along a line V—V in FIG. 4.

FIG. 4 is a perspective view of a retainer 30 according to another embodiment of the present invention and FIG. 5 is a cross sectional view taken along a line V—V in FIG. 4. In FIGS. 4 and 5, portions identical with those in the embodiment shown in FIG. 1 carry the same reference numerals.

The retainer 30 also comprises a main plate portion 12 and mounting members 14, 16, 18 and 20, an opening 22 and bolt passing holes 24 are perforated in the main plate portion 12, and mounting holes 26 are perforated in the mounting members 16 and 20. In this embodiment, a reinforcing member 32 made of a metal plate such as an iron plate is buried from the periphery of the opening 22 to the mounting hole 26. Further, a mesh 28 is secured to the reinforcing member 32 by means of welding or the like and the mesh 28 is buried in the entire portion other than the reinforcing member 32.

In the retainer 30 shown in FIGS. 4 and 5, an extremely large stress is exerted when the inflator is actuated. However, since the reinforcing member 32 made of the metal plate is buried along the periphery of the bolt passing holes 24 and the mounting holes 26, even if an extremely large stress is applied to the periphery of the holes 24 and 26, the retainer 30 can withstand the stress effectively and it is possible to firmly retain the retainer 30 to the steering means or firmly retain the inflator or the air bag to the retainer 30.

Figure 6:
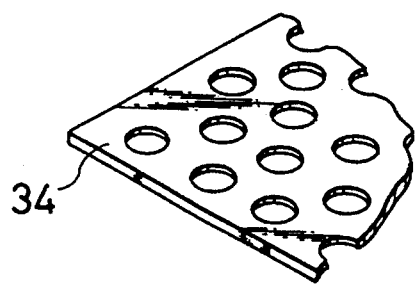
FIG. 6 is a perspective view of a metal plate with holes.

Although, in the foregoing embodiment, the mesh 28 is buried in the synthetic resin, a plate with holes 34 shown in FIG. 6 may be buried instead of the mesh in the synthetic resin.

Figure 7:
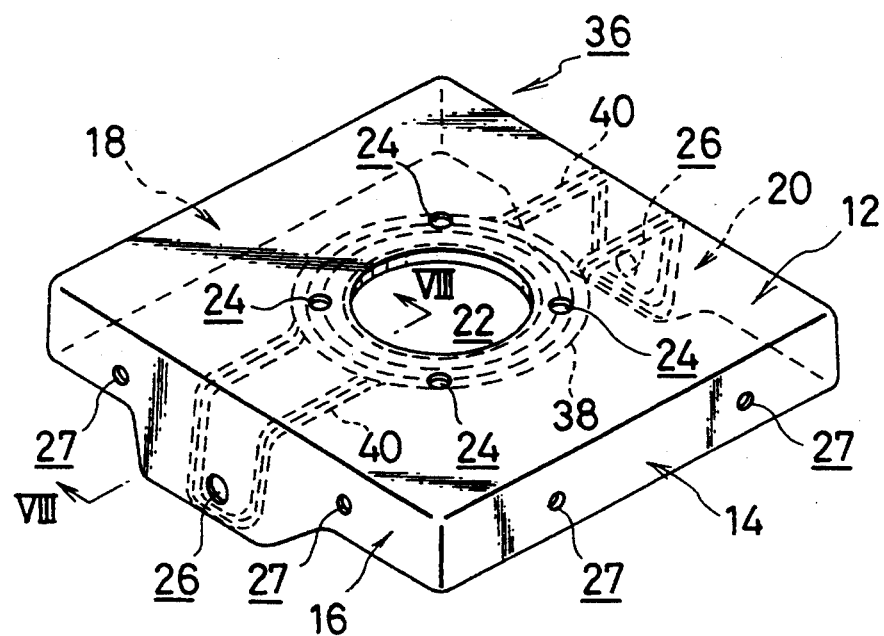
FIG. 7 is a perspective view of a retainer 36 according to a preferred embodiment.
Figure 8:
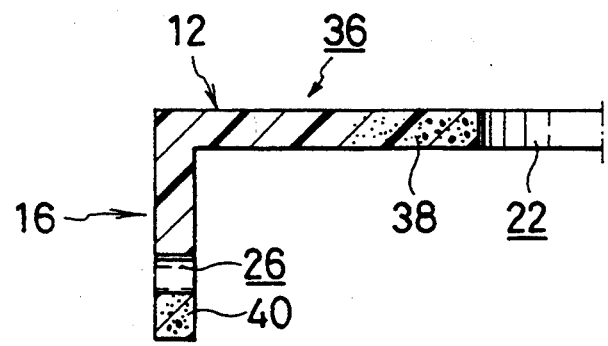
FIG. 8 is a cross sectional view taken along a line VIII—VIII in FIG. 7.

FIG. 7 is a perspective view of a retainer 36 according to a further embodiment of the present invention and FIG. 8 is a cross sectional view taken along a line VIII—VIII in FIG. 7. Also in FIGS. 7 and 8, portions identical with those in the previous embodiments carry the same reference numerals.

In this embodiment, the retainer 36 is made of a fiber-reinforced synthetic resin. That is, the main plate portion 12 and the mounting members 14, 16, 18 and 20 are constituted with a resin comprising a synthetic resin in which chopped strands of carbon fibers or glass fibers are dispersed. Further, long fibers of carbon fibers or glass fibers are buried along the periphery of the opening 22, the bolt passing holes 24 and the mounting holes 26, to which an extremely large stress is applied when the inflator is actuated. Namely, long fibers 38 of carbon fibers or glass fibers are spirally arranged so as to surround the opening 22. Further, long fibers 40 of carbon fibers or glass fibers are burned such that they extend from the portion of the spiral long Fibers 38 as far as the portion to the outside of the mounting holes 26, turn-back from the portion outside of the mounting holes 26 along a U-shaped path and return to the portion For the spiral long fibers 38.

Since the retainer 36 shown in FIGS. 7 and 8 is made of fiber-reinforced synthetic resin, it is extremely light in weight and since it is also reinforced with the long fibers, the strength is remarkably great. In addition, since the portion for the bolt passing holes 24 and the mounting holes 26 are reinforced with the long fibers 38 and 40, it can sufficiently withstand even against an extremely large stress upon actuation of the inflator. Furthermore, the retainer 36 can also be mounted to the steering means extremely firmly. That is, it is quite free from a worry that the portion of the mounting members 16 and 20 of the retainer at the outside of the mounting holes 26 suffers from tearing, and the strength for attaching the retainer to the steering means is extremely increased.

The foregoing embodiments only illustrate examples of the present invention and the invention may be constituted other than that shown in the drawings. Namely, the retainer may have a shape other than that shown in the drawings. Further, the reinforcing fiber is not restricted only to the glass fiber or the carbon fiber but may be metal fiber, aromatic polyamide fiber or the like.

As has been described above, since the retainer used for the air bag device according to the present invention is entirely made of the synthetic resin, it is extremely reduced in weight. In addition, it shows no rusting and is excellent in durability. Further, if a reinforcing member is buried, a sufficient strength can be maintained. The strength for mounting the retainer to the steering means is extremely high.

What is claimed is:

1. A retainer used for an air bag device for use in a driver's side of a vehicle, comprising,
    a main plate portion having an opening for mounting an inflator,
    mounting members depending from sides of the main plate portion, each mounting member having a mounting hole therein for mounting the retainer to steering means, and
    first long fibers extending around a periphery of the opening in the main plate portion, and two sets of second long fibers partly surrounding the respective mounting holes, each set of the second long fibers extending from the first long fibers toward the mounting hole, partly surrounding the mounting hole at a side away from the opening, and returning again to the first long fibers in the main plate portion,
    wherein said retainer is made of a synthetic resin, and said first and second long fibers are buried in the synthetic resin as a reinforcing material.

2. A retainer used for an air bag device for use in a driver's side of a vehicle, comprising,
    a main plate portion having an opening for mounting an inflator, and mounting members depending from sides of the main plate portion and having mounting holes therein for mounting the retainer to steering means, said mounting holes facing each other such that the opening is located between the mounting holes, said main plate portion and mounting members forming the retainer and being made of a synthetic resin,
    a metal plate buried in the synthetic resin of the retainer, said metal plate including an annular portion having a hole corresponding to the opening of the main plate portion and holes corresponding to bolt passing holes for reinforcement around the opening, and two elongated portions integrally formed with the annular portion, said elongated portions extending in opposite directions from the annular portion toward the mounting members and having holes corresponding to the mounting holes of the mounting members so that areas around the mounting holes and the opening are integrally connected together for reinforcement by the metal plate, and
    a reinforcing material selected from the group consisting of a mesh and a plate with holes, said reinforcing material being fixed to the metal plate and extending therefrom to spread an entire portion of the retainer other than the metal plate.

* * * * *